US011009222B1

(12) United States Patent
Sevigny

(10) Patent No.: US 11,009,222 B1
(45) Date of Patent: May 18, 2021

(54) LIGHTING APPARATUS AND METHOD OF USE

(71) Applicant: Patrick James Sevigny, Lubbock, TX (US)

(72) Inventor: Patrick James Sevigny, Lubbock, TX (US)

( * ) Notice: Subject to any disclaimer, the term of this patent is extended or adjusted under 35 U.S.C. 154(b) by 0 days.

(21) Appl. No.: 16/707,024

(22) Filed: Dec. 9, 2019

(51) Int. Cl.
| | |
|---|---|
| *F21V 21/30* | (2006.01) |
| *F21V 23/04* | (2006.01) |
| *F21L 4/08* | (2006.01) |
| *A01M 31/00* | (2006.01) |
| *F21V 21/08* | (2006.01) |
| *F21Y 113/13* | (2016.01) |
| *F21Y 115/10* | (2016.01) |

(52) U.S. Cl.
CPC ............. *F21V 21/30* (2013.01); *A01M 31/00* (2013.01); *F21L 4/08* (2013.01); *F21V 21/0816* (2013.01); *F21V 23/04* (2013.01); *F21Y 2113/13* (2016.08); *F21Y 2115/10* (2016.08)

(58) Field of Classification Search
CPC .... F21V 21/30; F21V 21/0816; F21V 33/008; F21V 21/406; F21V 21/145; F21V 14/025; A01M 31/00; F21L 4/08; F21L 4/04; F21Y 2113/13; F21Y 2115/10; F21Y 2107/90; F21W 2131/10
See application file for complete search history.

(56) References Cited

U.S. PATENT DOCUMENTS

| | | | |
|---|---|---|---|
| 6,554,444 B2 | 4/2003 | Shimada et al. | |
| 7,121,678 B1* | 10/2006 | Shetter | F21S 9/022 |
| | | | 362/184 |
| 8,113,681 B2 | 2/2012 | Dallas et al. | |
| 8,783,908 B2 | 7/2014 | Gross et al. | |
| 8,840,272 B2* | 9/2014 | Manning | F41J 3/0004 |
| | | | 362/249.02 |
| 9,080,735 B1* | 7/2015 | Cameron | F21L 4/025 |
| 9,651,232 B1* | 5/2017 | Fletcher | F21V 14/02 |
| 10,076,111 B2* | 9/2018 | Hays | H04N 5/23238 |
| 10,551,043 B1* | 2/2020 | Mullin | F21V 21/06 |
| 10,753,587 B1* | 8/2020 | Liang | F21V 23/0414 |
| 2003/0137840 A1* | 7/2003 | Citron | F21V 21/30 |
| | | | 362/249.07 |

(Continued)

FOREIGN PATENT DOCUMENTS

| | | |
|---|---|---|
| CN | 204313965 | 6/2015 |
| CN | 106838835 | 6/2017 |

(Continued)

*Primary Examiner* — Peggy A Neils
(74) *Attorney, Agent, or Firm* — Robert C. Corbett Technology Law, PLLC

(57) ABSTRACT

A lighting apparatus includes a frame, a first member rotatably connected to the frame for rotation about a first axis, and a second member rotatably connected to the frame for rotation about the first axis independently of the first member. A first light assembly has a first structure and a first plurality of lights rigidly mounted to the first structure. A second light assembly has a second structure and a second plurality of lights rigidly mounted to the second structure; The first light assembly is rotatably connected to the first member for rotation about a second axis and the second light assembly is rotatably connected to the second member for rotation about a third axis.

6 Claims, 5 Drawing Sheets

(56) References Cited

U.S. PATENT DOCUMENTS

| | | | | |
|---|---|---|---|---|
| 2009/0322259 | A1* | 12/2009 | Glass | F21L 4/00 |
| | | | | 315/360 |
| 2014/0265936 | A1 | 9/2014 | Unger et al. | |
| 2016/0084485 | A1* | 3/2016 | Bowcutt | F21V 21/406 |
| | | | | 362/191 |
| 2016/0102815 | A1* | 4/2016 | Bailey | F21V 21/30 |
| | | | | 362/477 |
| 2018/0180267 | A1* | 6/2018 | Theodoro | F21V 21/145 |
| 2019/0234587 | A1* | 8/2019 | Ohara | F21V 21/0965 |

FOREIGN PATENT DOCUMENTS

| | | |
|---|---|---|
| DE | 202009017552 U1 | 5/2010 |
| ES | 1209789 | 12/2018 |

\* cited by examiner

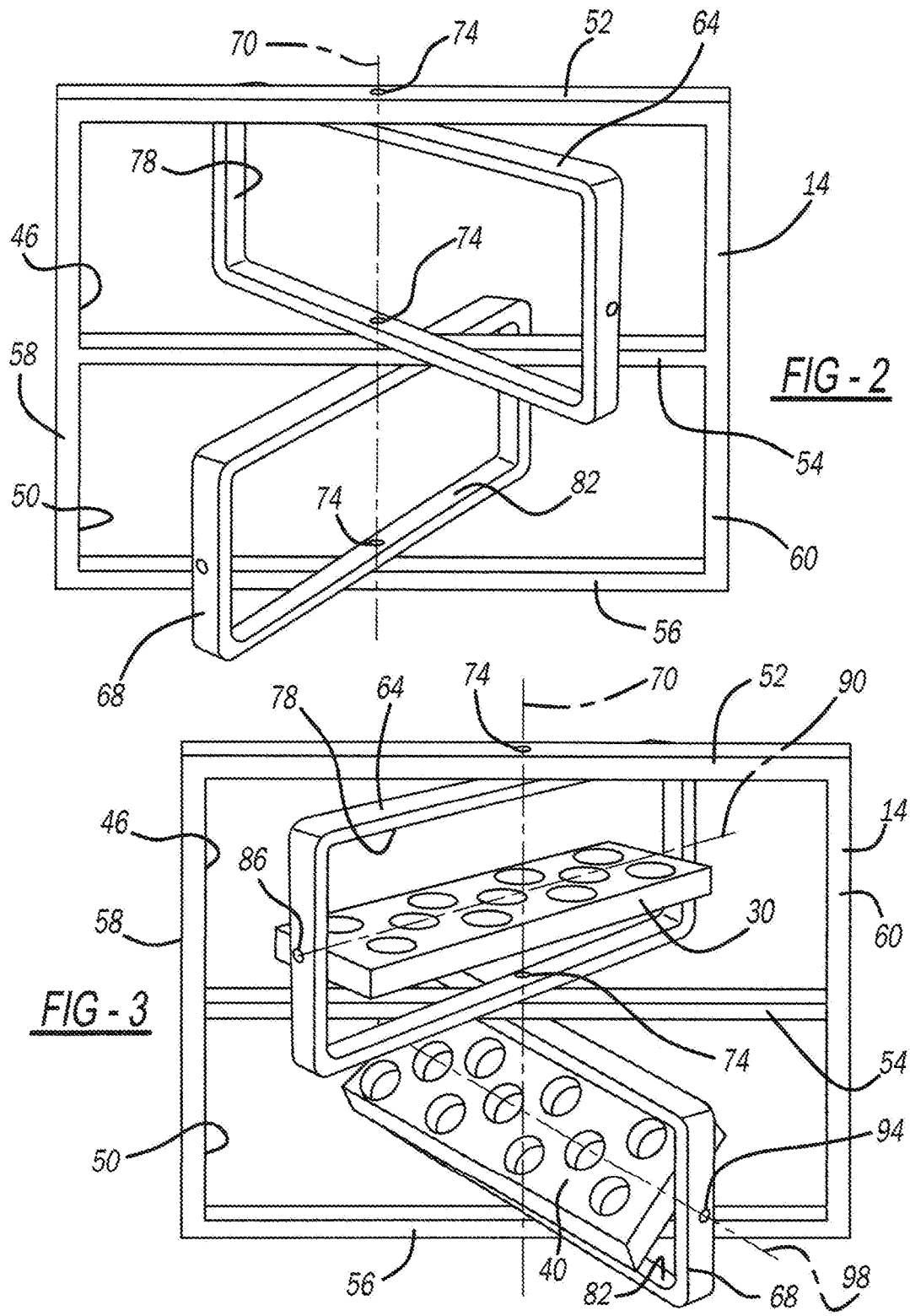

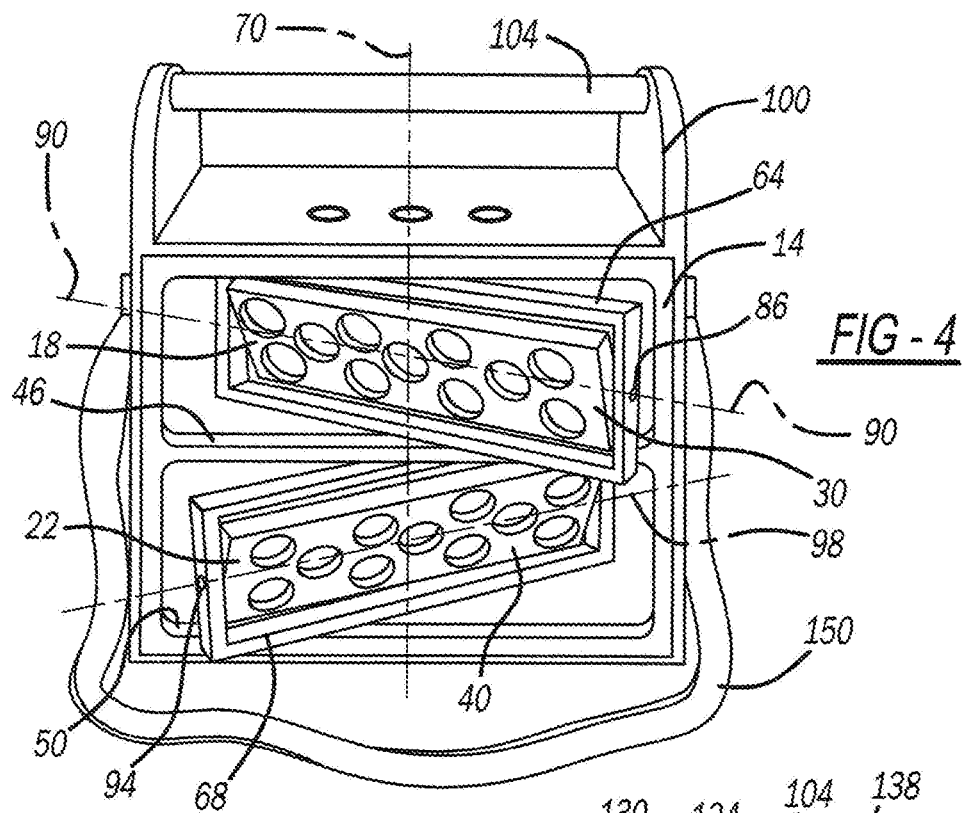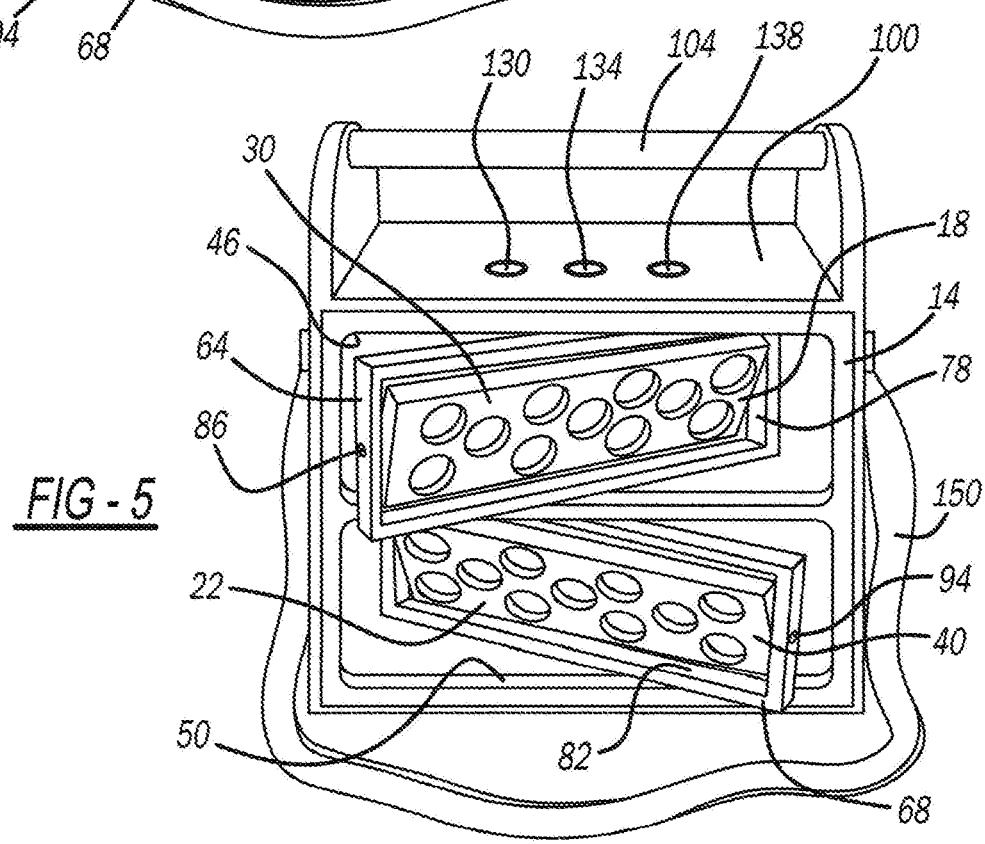

LIGHTING APPARATUS AND METHOD OF USE

TECHNICAL FIELD

This disclosure relates to lighting apparatuses.

BACKGROUND

When hunting wild hogs at night, it is desirable to use a light that is perceptible by the hunter, but not by hogs or other game. Hunters therefore use colored lights, such as red lights or green lights, in the form of flashlights or lights mounted to a bow, rifle, etc.

SUMMARY

A lighting apparatus includes a frame, a first member rotatably connected to the frame for rotation about a first axis, and a second member rotatably connected to the frame for rotation about the first axis independently of the first member. A first light assembly has a first structure and a first plurality of lights rigidly mounted to the first structure. A second light assembly has a second structure and a second plurality of lights rigidly mounted to the second structure; The first light assembly is rotatably connected to the first member for rotation about a second axis and the second light assembly is rotatably connected to the second member for rotation about a third axis.

The lighting apparatus thus provides a high degree of adjustability in the directions that light is projected from the apparatus. In one embodiment, at least some of the lights in the first and second light assemblies are red or green, which enables the use of the device in hunting game that cannot perceive the red or green light, such as wild hogs.

A corresponding method of use is also provided.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIG. 2 is a schematic, perspective view of a frame of the lighting apparatus;

FIG. 3 is a schematic, perspective view of the frame with light assemblies operatively connected thereto;

FIG. 4 is a schematic, front view of the lighting apparatus with the first light assembly and the second light assembly in respective first positions;

FIG. 5 is a schematic, front view of the lighting apparatus with the first and second light assemblies in respective second positons;

DESCRIPTION OF THE PREFERRED EMBODIMENTS

Figure 1:
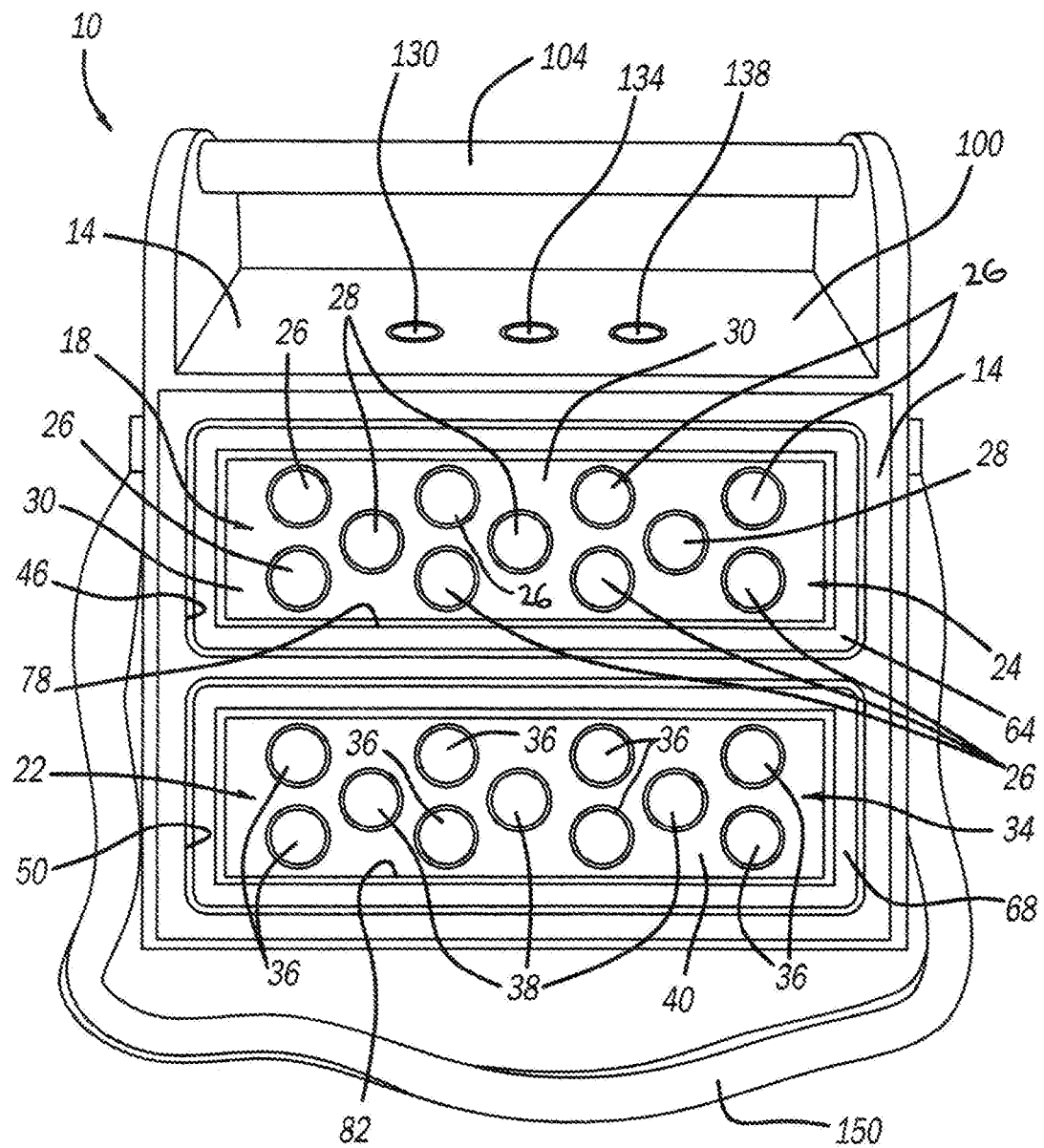
FIG. 1 is a schematic, front view of a lighting apparatus in accordance with the claimed invention.

Referring to the Figures, wherein like reference numbers refer to like components throughout, a lighting apparatus 10 in accordance with the claimed invention is schematically depicted. The lighting apparatus 10 includes a frame 14, a first light assembly 18, and a second light assembly 22. The first light assembly 18 includes a first set lights 26, a second set of light 28, and a first structure 30. The lights 26, 28 are substantially rigidly connected to the first structure 30 for unitary movement therewith; i.e., the first structure 30, the first set lights 26, and the second set of lights 28 are interconnected such that the first structure 30, the first set of lights 26, and the second set of lights 28 move together as a single unit.

Similarly, the second light assembly 22 includes a third set of lights 36, a fourth set of lights 38, and a second structure 40. The lights 36, 38 are substantially rigidly connected to the second structure 40 for unitary movement therewith; i.e., the second structure 40 and the lights 36, 38 are interconnected such that the second structure 40 and the lights 36, 38 move together as a single unit.

In the embodiment depicted, the first and second structures 30, 40 are panels having holes formed therein; each of the lights 26, 28, 36, 38 is in a respective hole formed in one of the panels. However, it should be noted that the first and second structures 30, 40 may have other configurations within the scope of the claimed invention.

The lights 26, 28, 36, 38 in the embodiment depicted are light-emitting diodes, though it should be noted that other light-emitting apparatuses may be employed as lights within the scope of the claimed invention. The first set of lights 26 and the third set of lights 36 emit a first color; the second set of light lights 28 and the fourth set of lights 38 emit a second color. In the embodiment depicted, the first color is either red or green, or perceived by the human eye as red or green, and the second color is white, or perceived as white by the human eye. In other embodiments, the lights may emit light in the infrared spectrum for use with night-vision scopes or goggles, or blue for use in tracking blood trails. It should be noted that any colors (which may includes invisible ranges on the electromagnetic spectrum) may be employed within the scope of the claimed invention.

In the embodiment depicted, the first set includes eight lights 26, and the second set includes three lights 28. Lights 26 are arranged in two rows of four lights 26. Lights 28 are arranged in a single row such that each of lights 28 is disposed equidistant from four of lights 26. Similarly, the third set includes eight lights 36, and the fourth set includes three lights 38. Lights 36 are arranged in two rows of four lights 36. Lights 38 are arranged in a single row such that each of lights 38 is disposed equidistant from four of lights 36.

The frame 14 in the embodiment depicted defines a first rectangular hole 46 and a second rectangular hole 50. More specifically, the frame 42 includes first, second, and third segments 52, 54, 56 that are spaced apart from each other and extend parallel to one another. The frame 14 also includes fourth and fifth segments 58, 60 that are parallel to each other and perpendicular to segments 52, 54, 56. The fourth and fifth segments 58, 60 interconnect the first, second, and third segments 52, 54, 56 and cooperate with the first, second, and third segments 52, 54, 56 to define the holes 46, 50.

A first member 64 is disposed within the first hole 46 and a second member 68 is disposed within the second hole 50. The first member 64 and the second member 68 are rotatably mounted to the frame 14 such that the first member 64 and the second member 68 are independently rotatable with respect to the frame 14 about a first axis 70, as shown in FIGS. 4 and 5. More specifically, in the embodiment depicted, the first member 64 and the second member 68 are mounted to the frame by pivot pins 74 that are coaxial with the first axis 70.

The first member 64 defines a hole 78 and the second member 68 defines another hole 82. The holes 78, 82 are slightly larger than the first and second structures 30, 40. The first structure 30 is disposed within the hole 78 formed by the first member 64, and the second structure 40 is disposed within the hole 82 formed by the second member 68. The first structure 30, and thus the first light assembly 18, is rotatably connected to the first member 64 by pivot pins 86.

Accordingly, the first light assembly 18 is connected to the first member 64 for unitary rotation with the first member 64 about axis 70; i.e., the first light assembly 18 and the first member 64 rotate together as a single unit about axis 70. The first light assembly 18 is rotatable with respect to the first member 64 about a second axis 90 that is coaxial with pivot pins 86. Thus, the first light assembly 18 is selectively rotatable with respect to the frame 14 about axis 70, and rotatable with respect to the first member 64 about axis 90. The second axis 90 is perpendicular to the first axis 70.

The second structure 40, and thus the second light assembly 22, is rotatably connected to the second member 68 by pivot pins 94. Accordingly, the second light assembly 22 is connected to the second member 68 for unitary rotation with the second member 68 about axis 70; i.e., the second light assembly 22 and the second member 68 move together as a single unit about axis 70. The second light assembly 22 is rotatable with respect to the second member 68 about a third axis 98 that is coaxial with pivot pins 94. Thus, the second light assembly 22 is selectively rotatable with respect to the frame 14 about axis 70, and rotatable with respect to the second member 68 about axis 98. The third axis 98 is perpendicular to the first axis 70.

Figure 6:
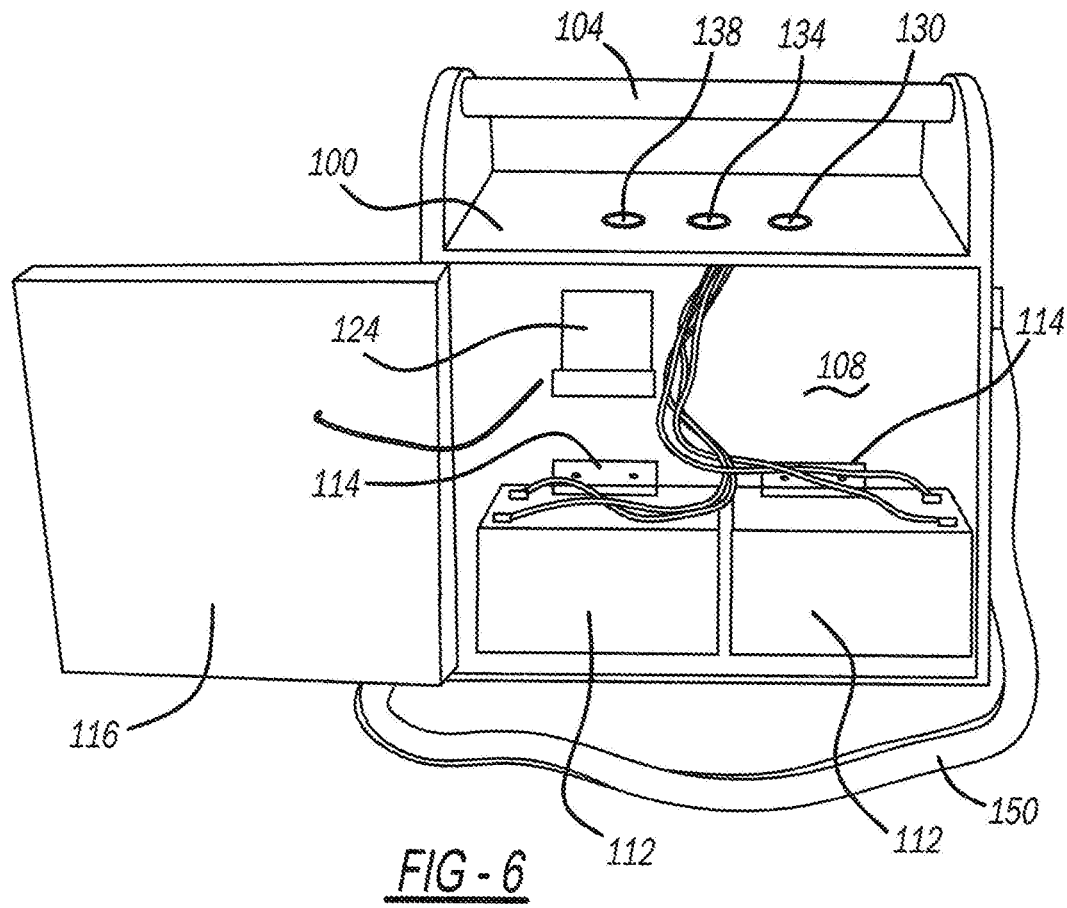
FIG. 6 is a schematic, rear view of the lighting apparatus with a rear door in its open position.

The frame 14 is mounted to a case 100. The case 100 in the embodiment depicted has a carrying handle 104 for facilitating the transport of the apparatus 10. The carrying handles 104 is preferably spaced from the remainder of the case 100 such that the handle 104 can be grasped with gloved hands. The case 100 also defines a compartment 108, as best seen in FIG. 6. Referring to FIG. 6, a bulkhead 110 separates the compartment 108 from the frame 14 and light assemblies 18, 22. The apparatus 10 includes at least one battery disposed within the compartment 108. In the embodiment depicted, the apparatus 10 includes two batteries 112. Battery-retention brackets 114 are mounted to the bulkhead 110 and prevent the batteries 112 from moving around within the compartment 108.

Figure 7:
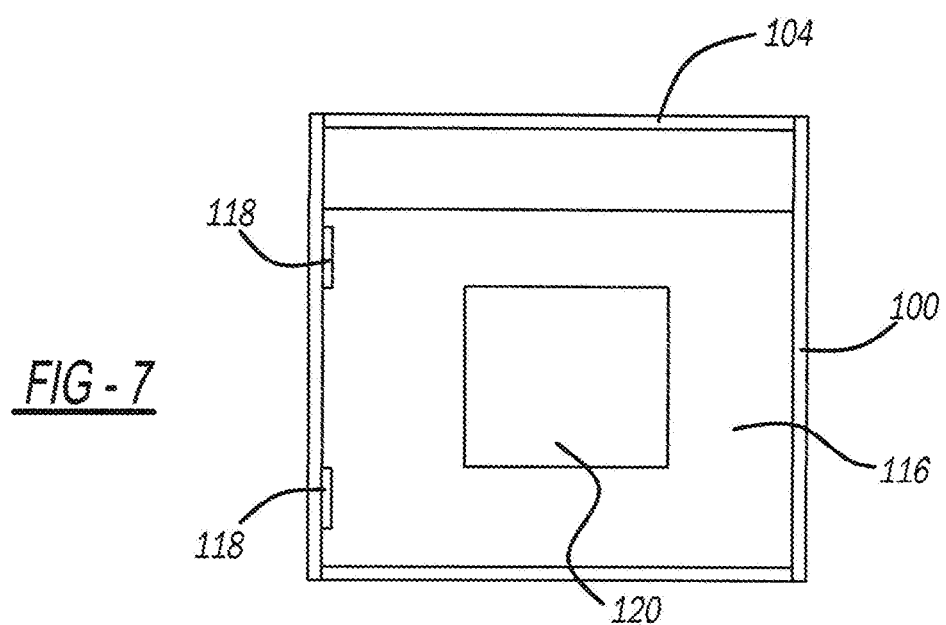
FIG. 7 is a schematic, rear view of the lighting apparatus with the rear door in its closed position.

A door 116 is rotatably connected to the case 100 via hinges 118 for movement between an open position, as shown in FIG. 6, and a closed position, as shown in FIG. 7. A latching system (not shown) is used to retain the door 116 in its closed position. Those skilled in the art will recognize various latching systems that may be employed to releasably retain the door 116 in the closed position, including, for example, a friction latch. A solar panel 120 is mounted to the door 116 and operatively connected to the batteries 112 via a charge controller 124, as understood by those skilled in the art. When the solar panel 120 is exposed to light, the solar panel 120 generates an electric current that charges the batteries 112. Although any power source may be employed within the scope of the claimed invention, the batteries 112 in one preferred embodiment are 12 volt, 7 amp-hour batteries.

The apparatus 10 includes three switches 130, 134, 138 that are mounted to the case 100 below the handle 104. In the embodiment depicted, the switches 130, 134, 138 are toggle switches and are relatively flat and flush to avoid accidental movement of the switches 130, 134, 138 when the apparatus 10 is being transported by the handle 104. The switches 130, 134, 138 are preferably spaced apart from one another such that a user can operate one of the switches with a gloved hand without inadvertently moving another of the switches.

Figure 8:
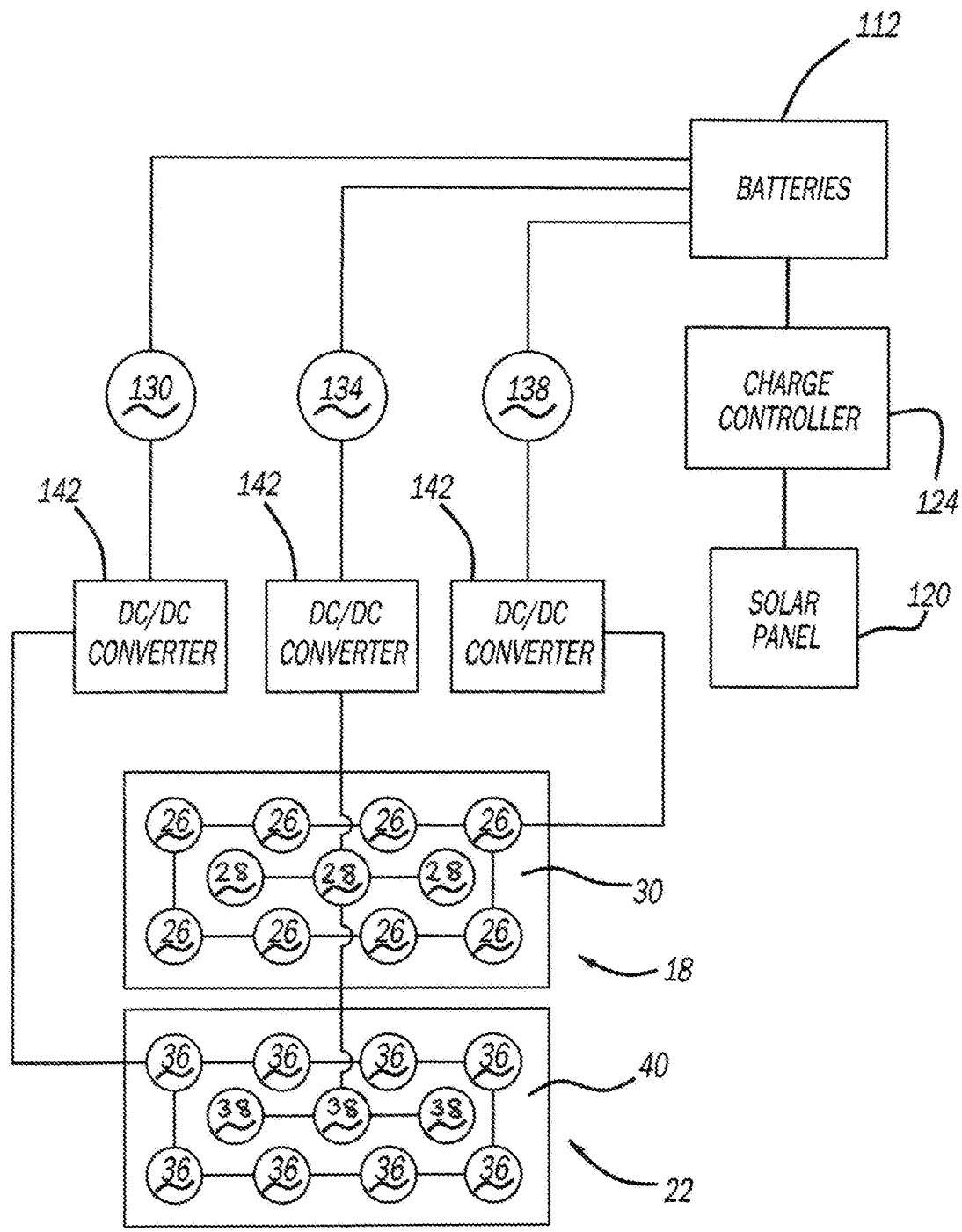
FIG. 8 is a schematic diagram showing the electrical connections between a battery, switches, solar panel, and the lights of the first and second light assemblies.

Referring specifically to FIG. 8, the batteries 112 are operatively connected to the lights 26, 28, 36, 38 and switches 130, 134, 138. More specifically, switch 138 controls the flow of electricity from the batteries 112 to the first set of lights 26. Switch 130 controls the flow of electricity from the batteries 112 to the third set of lights 36. Switch 134 controls the flow of electricity from the batteries 112 to the second set of lights 28 and the fourth set of lights 38. As understood by those skilled in the art, DC/DC converters 142 are employed in the circuits to protect the light emitting diodes.

Accordingly, the user is provided with a variety of lighting arrangements, depending on the statuses of the switches 130, 134, 138. If only the lights 28, 38 emitting the second color (e.g., white) are desired, such as during tracking of an animal after it has been shot, or when field dressing the animal, then only switch 134 is in its closed position, thereby providing a closed circuit with the batteries 112 and lights 28, 38. If it is desired that all lights 26, 36 emitting the first color (e.g., red or green) are illuminated, then both switches 130, 138 are in their respective closed positions, thereby providing a closed circuit with the batteries 112 and lights 26, 36. Alternatively, for example to save battery life, it may be desirable to have only one of switches 130, 138 in its closed position. For maximum illumination, all switches 130, 134, 138 may be in their closed positions, thereby causing all the lights 26, 28, 36, 38 to be illuminated.

The apparatus 10 also includes a flexible strap 150 mounted to the case 100. The strap 150 may be used as a shoulder strap to aid in carrying the apparatus 10, and/or it may be used to suspend the apparatus 10 from a tree branch or other object. he apparatus 10 may also include feet (not shown) mounted to the case 100 or similar structure for supporting the apparatus 10 above the ground.

The apparatus 10 provides a variety of lighting for use during hunting. For example, light assembly 18 may be rotated about axis 70 in one direction while light assembly 22 is rotated about axis 70 in another direction, thereby providing a wide, but diffuse, cone of light that may, for example, illuminate an area that is 80 yards wide by 200 yards long or to illuminate two trails at the same time. Alternatively, the lighting assemblies 18, 22 may face the same direction, thereby providing more concentrated light in a smaller area, such as an area 100 yards long by 40 yards wide. Each of the lighting assemblies 18, 22 may be rotated about a respective horizontal axis 90, 98 to compensate for varied terrain elevation, etc.

While the best modes for carrying out the invention have been described in detail, those familiar with the art to which this invention relates will recognize various alternative designs and embodiments for practicing the invention within the scope of the appended claims.

The invention claimed is:

1. A lighting apparatus comprising:
   a frame;
   a first member being rotatably connected to the frame for rotation about a first axis;
   a second member being rotatably connected to the frame for rotation about the first axis independently of the first member;

a first light assembly having a first structure, a first set of lights rigidly mounted to the first structure, and a second set of lights rigidly mounted to the first structure;

a second light assembly having a second structure, a third set of lights rigidly mounted to the second structure, and a fourth set of lights rigidly mounted to the second structure;

said first light assembly being rotatably connected to the first member for rotation about a second axis;

said second light assembly being rotatably connected to the second member for rotation about a third axis;

a battery;

a first switch operatively interconnecting the battery and the first set of lights;

a second switch operatively interconnecting the battery and the third set of lights; and a third switch operatively interconnecting the battery and the second and fourth sets of lights;

wherein the first and third sets of lights emit a first color; and wherein the second and fourth sets of lights emit a second color.

2. The lighting apparatus of claim 1, wherein the second and third axes are perpendicular to the first axis.

3. The lighting apparatus of claim 1, wherein said first color is selected from the group consisting of red and green; and wherein said second color is white.

4. The lighting apparatus of claim 1, further comprising a solar panel in electrical communication with the battery.

5. The lighting apparatus of claim 4, further comprising a case defining a compartment; and wherein said battery is disposed within the compartment.

6. The lighting apparatus of claim 5, further comprising a flexible strap mounted to the case.

\* \* \* \* \*